US006961868B2

(12) United States Patent
Tormasov et al.

(10) Patent No.: US 6,961,868 B2
(45) Date of Patent: Nov. 1, 2005

(54) FAULT TOLERANT STORAGE SYSTEM AND METHOD USING A NETWORK OF SERVERS

(75) Inventors: Alexander Tormasov, South San Francisco, CA (US); Mikhail Khassine, South San Francisco, CA (US); Serguei Beloussov, Monte Serino, CA (US); Stanislav Protassov, Singapore (SG)

(73) Assignee: SWsoft Holdings, Ltd. (BM)

( * ) Notice: Subject to any disclaimer, the term of this patent is extended or adjusted under 35 U.S.C. 154(b) by 676 days.

(21) Appl. No.: 09/918,875

(22) Filed: Jul. 31, 2001

(65) Prior Publication Data

US 2002/0116659 A1 Aug. 22, 2002

Related U.S. Application Data

(60) Provisional application No. 60/269,452, filed on Feb. 16, 2001.

(51) Int. Cl.[7] .............................................. G06F 11/00
(52) U.S. Cl. .............................. 714/6; 714/4; 714/770; 714/756; 714/784
(58) Field of Search ................................ 714/6, 4, 770, 714/756, 784

(56) References Cited

U.S. PATENT DOCUMENTS

| 5,305,326 | A | | 4/1994 | Solomon et al. ........... 371/11.1 |
|---|---|---|---|---|
| 5,537,533 | A | | 7/1996 | Staheli et al. .......... 395/182.03 |
| 5,713,017 | A | | 1/1998 | Lin et al. ..................... 395/608 |
| 5,729,763 | A | * | 3/1998 | Leshem ........................ 710/38 |
| 5,768,623 | A | * | 6/1998 | Judd et al. ..................... 710/37 |
| 5,774,643 | A | * | 6/1998 | Lubbers et al. ............... 714/20 |
| 5,996,086 | A | * | 11/1999 | Delaney et al. ................. 714/4 |
| 6,067,635 | A | * | 5/2000 | DeKoning et al. .............. 714/6 |
| 6,157,991 | A | | 12/2000 | Arnon ......................... 711/161 |
| 6,163,856 | A | | 12/2000 | Dion et al. ..................... 714/4 |
| 6,173,293 | B1 | | 1/2001 | Thekkath et al. ........... 707/201 |
| 6,173,377 | B1 | | 1/2001 | Yania et al. ................. 711/162 |
| 6,212,640 | B1 | | 4/2001 | Abdelnur et al. ........... 713/201 |
| 6,279,138 | B1 | * | 8/2001 | Jadav et al. ................. 714/800 |
| 6,330,687 | B1 | * | 12/2001 | Griffith .......................... 714/6 |
| 6,532,548 | B1 | * | 3/2003 | Hughes ......................... 714/6 |
| 6,567,891 | B2 | * | 5/2003 | Oldfield et al. ............. 711/114 |

OTHER PUBLICATIONS

Lee and Katz, "An Analytic Performance Model of Disk Arrays", 1993, ACM, pp. 98–109.*
English language abstract of Tormasov, A.G. et al., *"Model of Distributed Data Storing With Adjustable Redundancy,"* available at http://zhurnal.ape.relarn.ru/articles/2001/035.txt, pp. 1 (2001).
Pfister, Gregory F. 1998. *In search of clusters.* Second edition. Prentice Hall, ISBN 0–13–899709–8.

(Continued)

*Primary Examiner*—Nadeem Iqbal
*Assistant Examiner*—Timothy M. Bonura
(74) *Attorney, Agent, or Firm*—Sterne, Kessler, Goldstein & Fox P.L.L.C.

(57) ABSTRACT

The disclosed invention stores files in a set of independent, functionally equal pieces. These pieces are placed on different servers of a distributed network to achieve a predetermined level of fault tolerance. Terms of fault tolerance are defined in terms of amount of unavailable sites in the network allowing receipt and access to the data file. Maximal and minimal number of pieces available are variable method parameters. The minimal amount of data pieces k needed to restore a data file is defined. The size of each piece is approximately equal to 1/k of the original file size. The maximal amounts of pieces are defined during distribution operation and depend upon a requested fault tolerance level. Redundancy in data storage is minimized and varies dynamically by changing the total amount of pieces available. Significant increase in data transfer rate is possible because all file pieces could be transferred parallel and independently.

74 Claims, 4 Drawing Sheets

OTHER PUBLICATIONS

Roman, Steven 1996. *Introduction to Coding and Information Theory* (*Undergraduate Texts in Mathematics*) Steven Romann, P. R. Halmos (Editor), Springer Verlag ISBN: 0387947043.

B. Marcus, P. Siegel, R. Roth. *An Introduction to Coding for Constrained Systems* from handbook of Coding Theory, ed. W.C. Huffman and V. Pless, Elsevier Press, 1998.

B. Marcus, P. Siegel, R. Roth. *Concatenting Constrained Codes and ECC* from handbook of Coding Theory, ed. W.C. Huffman and V. Pless, Elsevier Press, 1998.

Hamming, Richard W. 1986. *Coding and Information Theory*, 2nd Ed., Prentice–Hall Inc.

Patterson, David A., Garth A. Gibson and Randy H. Katz. *A Case for Redundant Arrays of Inexpensive Disks (RAID)* by David A. Patterson, Computer Science Division Department of Electrical Engineering and Computer Sciences, 571 Evans Hall University of California Berkeley, CA 94720 CSD–87–391.

* cited by examiner

FAULT TOLERANT STORAGE SYSTEM AND METHOD USING A NETWORK OF SERVERS

This application claims the benefit of U.S. Provisional Application No. 60/269,452, titled "A Method of Storing and Retrieving Information With Controllable Redundancy for Fault Tolerance Distributed Data Storage" filed on Feb. 16, 2001 for priority under 35 U.S.C. §119(e), is related thereto, is commonly assigned therewith, and incorporates herein by reference in its entirety the subject matter thereof.

BACKGROUND OF THE INVENTION

1. Technical Field

This invention relates to the organization of a distributed data storage system, more particularly, the present invention relates to the storage and retrieval of information with controllable redundancy for fault tolerant distributed data storage.

2. Background

With the growth of the use of the Internet, the need for data storage systems with the capability to manage huge amounts of information has grown dramatically. Such data storage or information management systems must provide reliable service to millions of computer users simultaneously.

In prior art data storage networks, a large amount of data is broken into smaller pieces and transmitted using a store and forward mechanism.

Anyone deploying a data storage or information management system must deal with insufficient communication channel bandwidth and the inability of computer hardware components to handle the data storage load.

One prior art approach to solving the problems of insufficient bandwidth and the inability of computer hardware to store sufficient amounts of data has been to build a distributed network data storage system (Pfister 1998). In a typical distributed network data storage system, data is stored on a network of computers which consists of a mesh of data transmission links, switching nodes, and end nodes. The data pieces are transmitted on a series of links which connect the source of the information and the actual destination nodes for the stored information. The data pieces are then reassembled at the destination node. The nodes along the path between the source of the information and its destination are primarily responsible for making sure that each data piece received is transmitted on the correct outgoing link so that the data properly reaches its destination.

To properly meet user demands for information, a distributed network data storage system must provide high-availability of stored data to the computers needing the stored data (Pfister 1998). Specifically, a distributed network data storage system should be able to stay on-line with consistent availability of uncorrupted data, even if some hardware portion of the distributed network data storage system has crashed or becomes inaccessible because of an inability to transmit data. This is shown in FIG. 1, where file pieces 3 and 5 have become inaccessible due to a hardware failure and a data transmission line break, respectively.

To address the requirement for high-availability of stored data, one or more variations of a data mirroring technique (U.S. Pat. Nos. 6,173,377, 6,157,991, 5,537,533) have been used in prior art data storage systems. In the execution of a data mirroring technique, crucial data is simply duplicated in its entirety at several locations in the distributed data storage system. Special care must be taken to keep the data consistent across all locations where it is stored (U.S. Pat. No. 5,537,533). However, full mirroring of all data is costly both in hardware and physical time of transfer, particularly for large systems. One solution has been to keep the stored data consistent across all nodes, especially when the stored data could be changed on-line at several nodes simultaneously. This problem of keeping stored data consistent across all nodes in a data storage network is far from trivial.

There is little doubt that providing high-availability features in a distributed data storage system requires maintaining at least some level of redundancy of stored information. Historically, the problems associated with redundant data storage were addressed by the use of Redundant Arrays of Independent Disks (RAID) technology (Pfister 1998, Patterson et al.). The main concept behind RAID data storage technology is to divide the input data into units and then write/read several units of data simultaneously to several hard disk data storage systems. Several of the most commonly used configurations, or levels, of RAID arrays are described below.

The RAID Level 0 configuration implements a striped disk array for storing data. In a RAID Level 0 configuration, the data is broken down into blocks and each block is written to a separate data storage disk. The input/output performance of each disk drive is greatly improved by spreading the input/output load across many channels and disk drives. Reconstruction of the data set is accomplished by obtaining data blocks from each separate data storage disk.

The best data storage performance is achieved when the data to be stored is striped across multiple disk drives with each single disk drive attached to a single controller. No parity calculation overhead is involved, and there are no fault tolerance capabilities in the RAID Level 0 configuration. There is no fault tolerance in the RAID Level 0 configuration because a single disk drive is connected to a single controller. Accordingly, the failure of just one disk drive will result in corruption of the stored data.

The RAID Level 1 configuration implements what is known as "disc mirroring." Disc mirroring is done to assure the reliability of stored data and a high degree of fault tolerance. A RAID Level 1 configuration also enhances data read performance, but the improved data read performance and fault tolerance come at the expense of available capacity in the disk drives used to store data Specifically, the data to be stored is copied and then stored on multiple disk drives (or "mirrored"). The storage of data on multiple disk drives assures that, should one disk drive fail, the data is available from another disk drive on which the same data has been stored. The data read performance gain of a RAID Level 1 configuration can be realized if the redundant data is distributed evenly on all of the disk drives of a mirrored set within the subsystem. In a RAID Level 1 configuration, the number of data read requests and total wait state times both drop significantly. These drops are inversely proportional to the number of hard drives used in a RAID Level 1 configuration.

A RAID Level 5 configuration data storage algorithm represents a data storage methodology between a RAID Level 1 configuration and a RAID Level 0 configuration. The RAID Level 5 configuration is the last of the most common RAID data storage arrays in use, and is probably the most frequently implemented.

A RAID Level 5 configuration is really an adaptation of the RAID Level 0 configuration that sacrifices some data storage capacity for the same number of disk drives. However, the RAID Level 5 configuration gains a high level of data integrity or fault tolerance. The RAID Level 5 configuration takes advantage of RAID Level 0's data striping methods, except that data is striped with parity across all of the disk drives in the array. The stripes of parity information are calculated using the "Exclusive OR" function. By using the Exclusive OR function with a series of data stripes in the RAID Level S configuration, any lost data can easily be recovered. Should any one disk drive in the array fail, the missing information can be determined in a manner similar to solving for a single variable in an equation (for example, solving for x in the equation, 4+x=7). In an Exclusive OR operation, the equation would be similar to 1−x=1. Thanks to the use of the Exclusive OR operation, there is always only one possible solution (in this case, 0), which provides a complete error recovery algorithm in a minimum amount of storage space.

A RAID Level 5 configuration achieves very high data transfer performance by reading data from or writing data to all of the disk drives simultaneously in parallel while retaining the means to reconstruct data if a given disk drive fails, thus maintaining data integrity for the data storage system.

A RAID Level 5 configuration minimizes the data write bottlenecks by distributing parity stripes over a series of hard drives. In doing so, a RAID Level 5 configuration provides relief to the concentration of data write activity on a single disk drive, in turn enhancing overall system performance.

The disadvantages of RAID-like implementation for distributed data storage systems are clear. First, it is impossible to dynamically control redundancy (classic RAID algorithms work in the case of failure of only one disk drive; if two or more disk drives go off line simultaneously, there is no way to recover data). Second, RAID technology does not scale for more than ten disks, mainly due to the input/output intensive fault-recovery procedures which make the RAID technology unsuitable for systems where the unavailability of one or more nodes is common.

A similar data recovery problem arises when solving the problem of reliability of information transmission via communication channels. In this case algorithms of the Hamming error correction code (ECC)/error detection code (ECD) are usually used (Roman 1996). In general, there are two approaches to solving the problem of reliability of information transmission. Selecting a particular approach to solving this problem usually depends on requirements associated with the information transmission process. Both of the requirements associated with the information transmission process require transmitting redundant information to recover data in case of error. The first approach, called error-correction code (ECC), introduces redundancy into the stored information in the form of extra bits transmitted together with a data block so that it is possible to recover erroneous bits using received block and error-correction bits. The second approach, called error-detection code ECD, differs from the first approach in that one can only determine whether or not the data block contains errors without knowing which bits are incorrect.

One major drawback of both the error correction code and error detection code algorithms is that they are intended for data streaming recovery. Accordingly, these two algorithms carry a significant overhead in performance and amount of redundancy data. Even in case of errorless data transfer, one has to process a significantly larger amount of data than is necessary. Also, these two algorithms rely on the probability of a channel error. In other words, these two algorithms work correctly only if the total number of errors in the received block of data does not exceed some predetermined number n.

Accordingly, there still remains a need in the art for a system which permits the storage of large amounts of data across a distributed arbitrarily-connected network of servers which provides high availability and fault tolerance.

SUMMARY

The present invention defines a system and method for the storage of data across a distributed arbitrarily-connected network of servers which provides high availability and fault tolerance. More particularly, the disclosed system and method enables the storage and retrieval of data with controllable redundancy. The controlled redundancy enables the optimal utilization of data storage facilities. Using the disclosed data storage system, it is possible to achieve an appropriate level of fault tolerance when either some of the servers in a network become inaccessible because of internal malfunctions or their connections to the data storage network are broken. According to the disclosed method for data storage, data file storing is allowed without total mirroring of the stored data on each server in the network.

Each complete set of data is broken into numbered, interchangeable data pieces of equal size, the number of which "n" may vary over time. However, from any "k" ($k \leq n$) number of data pieces, it is always possible to restore the data storage file completely. The use of this data storage system creates a condition of redundancy. The size of each data piece is about 1/k of the size of the entire stored file. The total number "n" of file pieces contained in a system may vary depending on the configuration of the arbitrary network of servers and on the number of computers contained therein. However, the number of data pieces "n" is always equal to or greater than the number of data pieces needed to restore a file. While changing the number "n", the data stored in the existing pieces is not changed in any way. The number of data pieces may be large enough for modem computer networks and defines the selection of the storage algorithms.

The disclosed system and method for the storage of data across a distributed arbitrarily-connected network of servers also could be used for significant (up to "k" times) enlargement of the data transfer rate because of the fact that all pieces of the stored file could be transferred from "k" servers in parallel and independently from each other. Under some conditions, the disclosed data storage system and method provides the optimal utilization of network bandwidth and increases the rate of overall file transfer.

BRIEF DESCRIPTION OF THE DRAWING FIGURES

A better understanding of the data storage system and method of the present invention may be had by reference to the drawing figures wherein.

Figure 3:
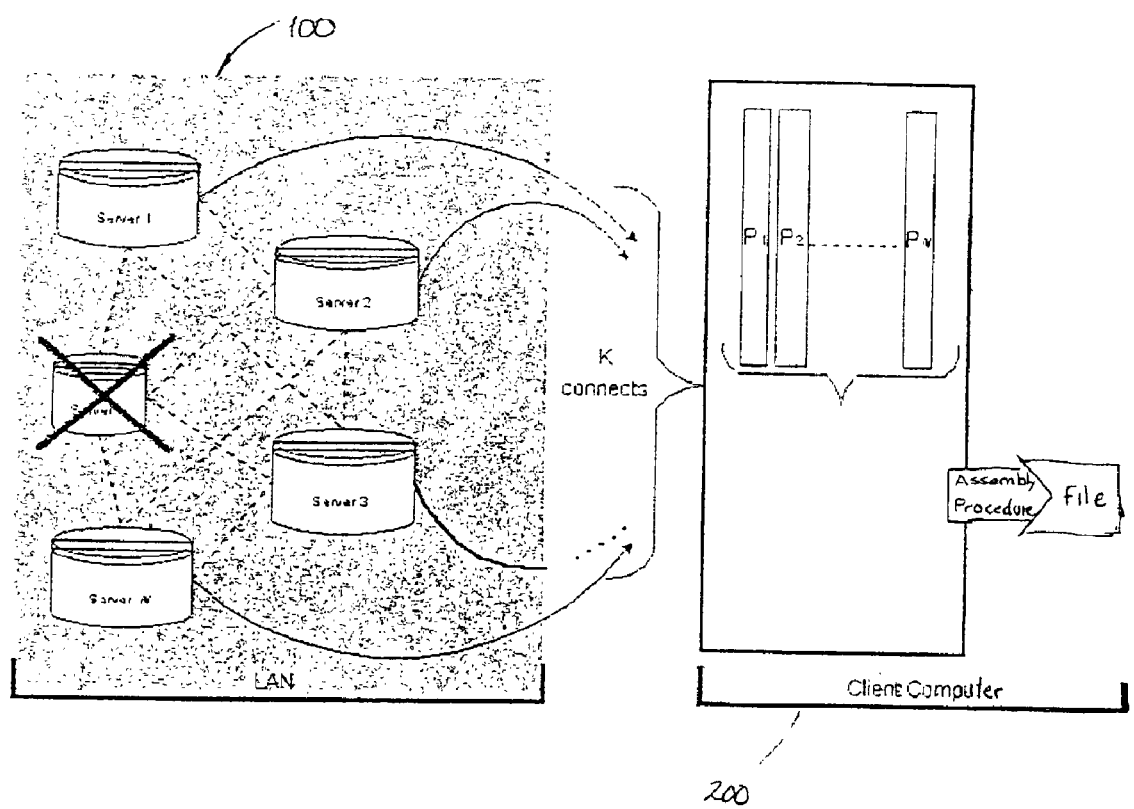
Figure 4:
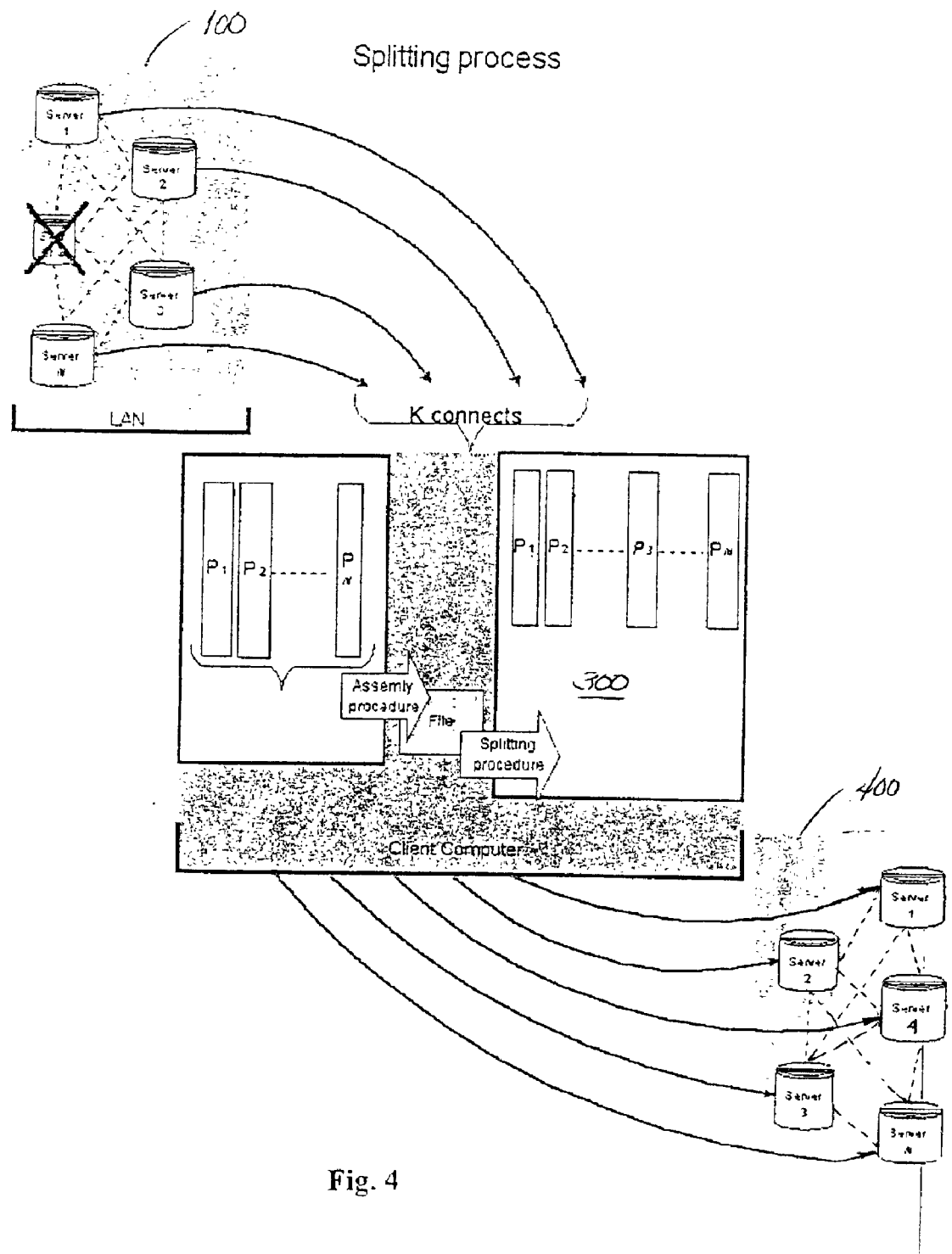

FIG. 3 is a schematic showing the system and method of the present invention for file restoration; specifically, the collection of file pieces from the distributed arbitrarily-connected network of servers and their assemblage into the original file; and FIG. 4 is a schematic showing the system and method of the present invention for additional generation of file pieces which could be done after initial distribution of data across the distributed arbitrarily-connected network of servers.

DETAILED DESCRIPTION OF THE INVENTION

The present invention defines a system and method for the storage of data files across a distributed arbitrarily-connected network of servers. Using the disclosed system and method, it is possible to achieve an appropriate level of data storage fault tolerance in a situation when some network servers become inaccessible because of internal malfunctions or breaks in the connection between servers in the network. The present invention provides a system and method which allows the storage of data files without a total mirroring of all data stored on each server in the network.

Each data file is proposed to be stored as a set of data pieces whose number "n" may vary over time. However, from any "k" number ($k \leq n$) of data pieces of the stored data file, it is always possible to restore the entire data file completely. The use of this data storage system creates a condition of redundancy. The size of each piece of the stored data file is about 1/k of the size of the entire stored data file. The number "n" of data pieces contained in the data storage system may vary depending on the configuration of the arbitrary network of servers and on the number of servers in the network. While changing the number "n", the data stored in the existing pieces is not changed in any way.

The first step in the disclosed method is to define an appropriate amount of data pieces $P_1, P_2, P_3 \ldots P_n$. A minimal amount "k" of data pieces needed to completely restore the file is defined usually from size requirements (for example, the size of one file piece could be taken close to optimal for transfer via Internet TCP/IP about 1 K byte).

The next step in the disclosed method is to define a fault tolerance level. For example, in a distributed arbitrarily-connected network including some number "L" working servers, fault tolerance is determined by setting the number "M" (M<L) of the working servers that could be switched off (or fail by themselves or due to network inaccessibility) simultaneously at any moment in time. To reconstruct the original file, at least M+k data pieces of the original file must be created and stored on at least. M+k separate servers in the network. In such a case, the ability to restore the original file, even in case of the simultaneous unavailability of M servers, is guaranteed. This is because if M servers become unavailable, the required minimum number of data pieces to reconstruct the data set will still be available ((M+k)−M=k).

Figure 1:
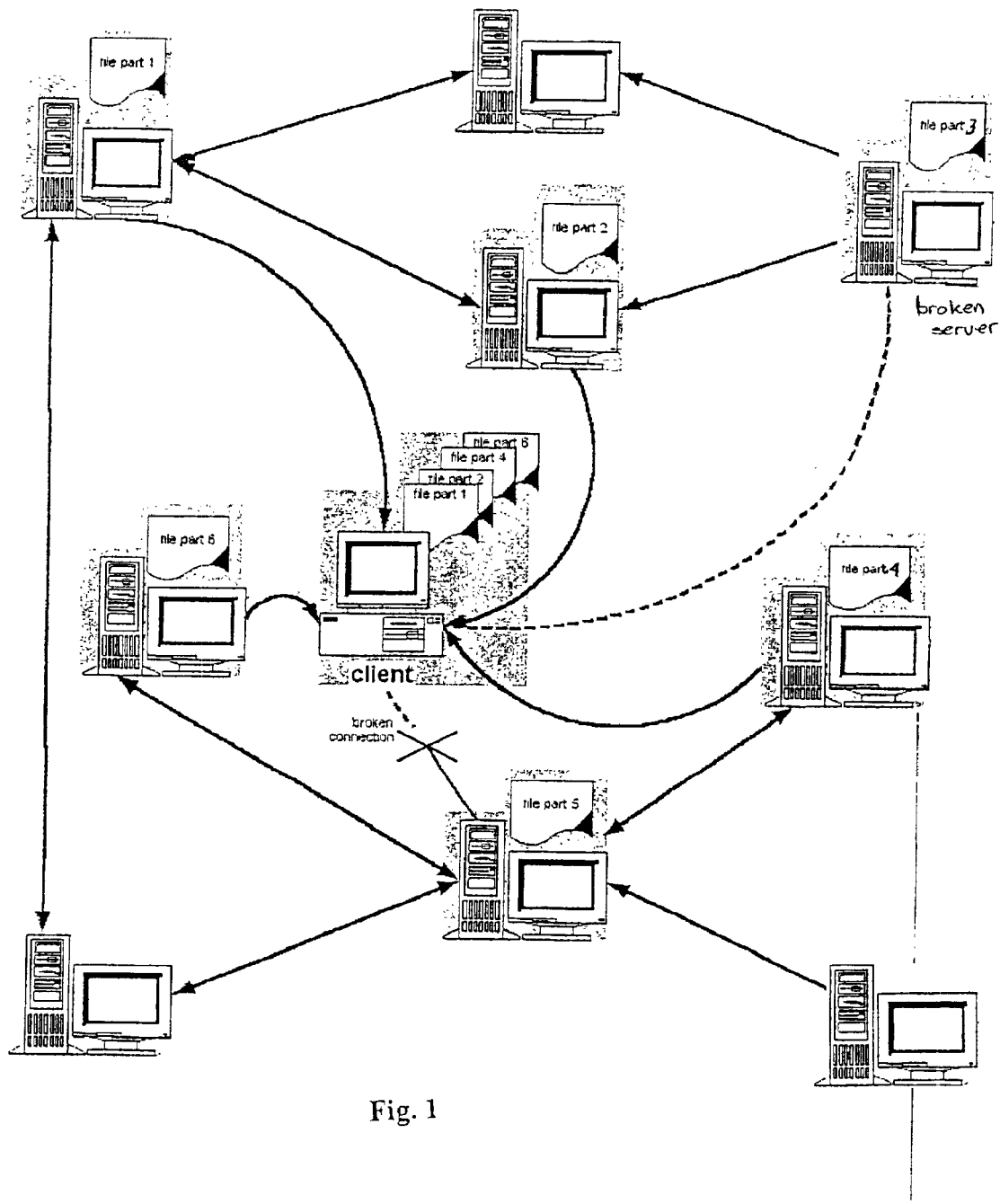
FIG. 1 is a schematic of a prior art system and method for information access on a distributed arbitrarily-connected network of servers showing the effect of a broken server or a break in a transmission line.
Figure 2:
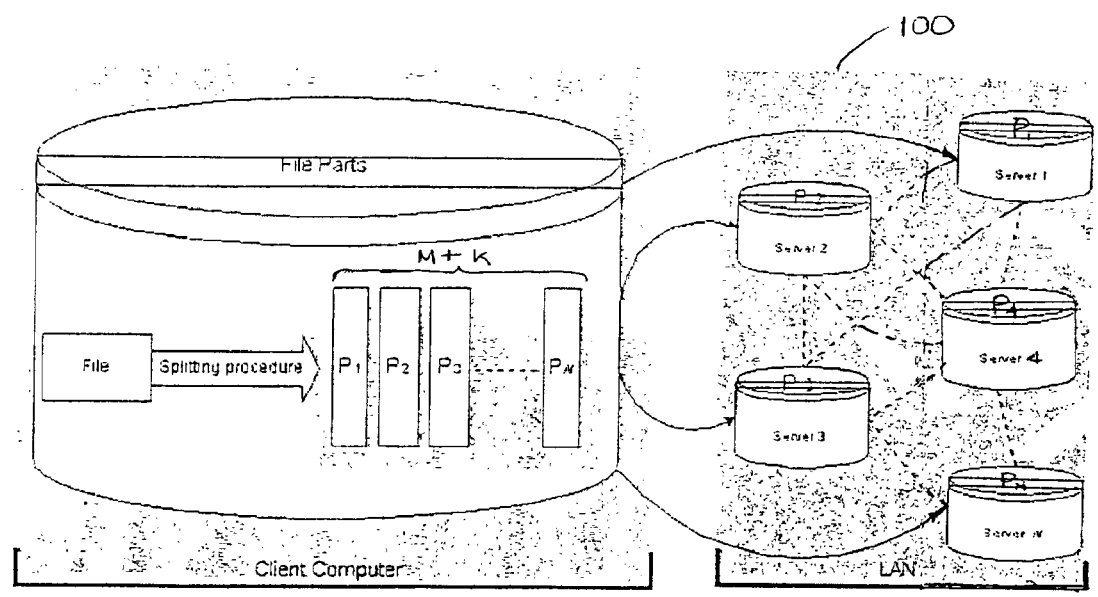
FIG. 2 is a schematic showing the system and method of the present invention for disassembling a file and storing file pieces on a distributed arbitrarily-connected network of servers.

In FIG. 2 the process of file storing inside a distributed data storage system is shown. The first data file is split into at least M+k pieces as shown in FIG. 2 by the blocks labeled $P_1, P_2, P_3 \ldots P_n$. In the second step, all of the created pieces are placed on different servers 1, 2, 3, 4 . . . n in the distributed arbitrarily-connected network of servers 100. Only after completion of such an operation will the step of storing the entire data file be treated as complete.

In FIG. 3 the process of retrieving the stored data from a distributed arbitrarily-connected data storage network 100 is shown. In the first stage of data retrieval, the required minimum number of data pieces "k" are received from the servers 1, 2, 3, 4 . . . n on which the data pieces are stored. However, because not all servers are needed to obtain "k" data pieces, some of the servers, e.g., server 4 in FIG. 3, could be inaccessible because of internal failure or because of data transmission line problems. Because at least "k" servers are still available within network 100, the entire data file can still be reconstructed. Therefore, in the first stage of data retrieval, as shown in the left side of FIG. 3, "k" data pieces would be collected, and in the second stage of data retrieval, as shown in the right side of FIG. 3, the collected pieces are reconstructed into the original file on the client computer 200.

In FIG. 4 the process of the additional generation of data pieces done after the initial distribution of data across a distributed arbitrarily-connected network 100 of servers 1, 2, 3, 4 . . . n is shown.

During the normal operation of the disclosed network storage system, the requested amount of file pieces "n" could vary. For example, some servers could be permanently shut down or the requested level of fault tolerance increases. In such cases, additional data pieces must be created; that is, the number "n" must increase. To create an additional set of data pieces, as shown in the central portion of FIG. 4, an original file is assembled following the standard procedure for splitting the stored data file into pieces as shown in FIG. 2. Later, additional data pieces are generated 300 and distributed across a data storage network 400 on non-used servers. The amount of redundancy is increased by a quantum of 1/k of the original file size.

The disclosed method also could be used for a significant (up to "k" times) increase in data transfer rate because pieces of a data storage file could be transferred in parallel from "k" or more servers independently from each other. Under some conditions, this method could give the optimal utilization of network bandwidth and speed up overall file transfer time.

While the disclosed invention has been described in terms of its preferred embodiment, those of ordinary skill in the art will understand that numerous other embodiments have been enabled. Such other embodiments shall be included within the scope and meaning of the appended claims.

BIBLIOGRAPHY

Hamming, Richard W. 1986. *Coding and Information Theory*, 2nd Ed., Prentice-Hall Inc.

Patterson, David A., Garth A. Gibson and Randy H. Katz. *A Case for Redundant Arrays of Inexpensive Disks (RAID)* by David A. Patterson, Computer Science Division Department of Electrical Engineering and Computer Sciences, 571 Evans Hall University of California Berkeley, CA 94720 CSD-87-391.

Pfister, Gregory F. 1998. *In search of clusters*. Second edition. Prentice Hall, ISBN 013-899709-8.

Roman, Steven 1996. *Introduction to Coding and Information Theory (Undergraduate Texts in Mathematics)* Steven Romann, P. R. Halmos (Editor), Springer Verlag ISBN: 0387947043.

U.S. Patent No. 6,173,377 Jan. 9, 2001 Yanai, et al. 711/162.

U.S. Patent No. 6,157,991 Dec. 5, 2000 Arnon 711/161.

U.S. Patent No. 5,537,533 Jul. 16, 1996 Staheli, et al. 714/5.

What is claimed is:

1. A method for data storage and retrieval from a network of servers, said method comprising the steps of:
   a. defining an amount of n data pieces;
   b. defining a minimal amount of data pieces k needed to restore a data file;

c. for a distributed arbitrarily-connected network of L servers, defining a number M of the servers that could be rendered inaccessible; and d. creating M+k data pieces for storage on M+k servers; whereby the ability to restore the data file from M servers is retained and the optimal utilization of data storage means obtained, and wherein k≦n and M+k<=L.

2. The method as defined in claim 1 wherein M<L.

3. The method of claim 1, further comprising creating at least M+k data pieces for storage on at least M+k servers.

4. The method of claim 1, wherein the same algorithm is used to create the M+k data pieces.

5. The method of claim 1, wherein the number L is variable.

6. A method for data storage and retrieval from a network of servers, said method comprising the steps of:

a. defining an amount of n data pieces;

b. defining a minimal amount of data pieces k needed to restore a data file;

c. for a distributed arbitrarily-connected network of L servers, defining a number M of the servers that could be rendered inaccessible; and d. creating M+k data pieces for storage on M+k servers, wherein said data pieces are numbered, interchangeable, and of equal size, and wherein M+k<=L.

7. A method for data storage and retrieval from a network of servers, said method comprising the steps of:

a. defining an amount of n data pieces;

b. defining a minimal amount of data pieces k needed to restore a data file;

c. for a distributed arbitrarily-connected network of L servers, defining a number M of the servers that could be rendered inaccessible; and d. creating M+k data pieces for storage on M+k servers, wherein the number of data pieces M+k depends on the fault tolerance level of and the number of servers in the network, and wherein M+k<=L.

8. A method for data storage and retrieval from a network of servers, said method comprising the steps of:

a. defining an amount of n data pieces;

b. defining a minimal amount of data pieces k needed to restore a data file;

c. for a distributed arbitrarily-connected network of L servers, defining a number M of the servers that could be rendered inaccessible; and d. creating M+k data pieces for storage on M+k servers, wherein the amount of redundancy data stored for each file is increased by an amount of about 1/k of the original file size, and wherein M+k<=L.

9. A system for data storage and retrieval from a network of servers, said system comprising:

a predetermined amount of data pieces n;

a minimal amount of data pieces k needed to restore a data file;

a predetermined number M of servers in a network containing L servers, that could be rendered inaccessible; and M+k data pieces for storage on M+k servers;

wherein the ability to restore a data file from M servers is retained and the optimal utilization of data storage means is obtained, and wherein k≦, and wherein M+k<=L.

10. The system as defined in claim 9, wherein M<L.

11. The system of claim 9, further comprising at least M+k data pieces for storage on at least M+k servers.

12. The system of claim 9, wherein the same algorithm is used to create the M+k data pieces.

13. The system of claim 9, wherein the number L is variable.

14. A system for data storage and retrieval from a network of servers, said system comprising:

a predetermined amount of data pieces n;

a minimal amount of data pieces k needed to restore a data file;

a predetermined number M of servers in a network containing L servers, that could be rendered inaccessible; and M+k data pieces for storage on M+k servers, wherein said data pieces are numbered, interchangeable, and of equal size, and wherein M+k<=L.

15. A system for data storage and retrieval from a network of servers, said system comprising:

a predetermined amount of data pieces n;

a minimal amount of data pieces k needed to restore a data file;

a predetermined number M of servers in a network containing L servers, that could be rendered inaccessible; and M+k data pieces for storage on M+k servers, wherein the number of data pieces M+k depends upon the fault tolerance level and the number of servers in the network, and wherein M+k<=L.

16. A system for data storage and retrieval from a network of servers, said system comprising:

a predetermined amount of data pieces n;

a minimal amount of data pieces k needed to restore a data file;

a predetermined number M of servers in a network containing L servers, that could be rendered inaccessible; and M+k data pieces for storage on M+k servers, wherein the amount of redundancy data stored for each file is increased by an amount of about 1/k of the original file size and can vary for each file, and wherein M+k<=L.

17. A method for data storage comprising:

defining a plurality of n data units that correspond to a data file;

defining a minimal number k of data units required to restore the data file;

defining a number of M servers out of a plurality of L servers that could be rendered inaccessible; and creating M+functionally equivalent data units for storage on M+k servers out of the plurality of L servers, wherein M+k<=L.

18. The method of claim 17, wherein the data units are numbered and of equal size.

19. The method of claim 17, wherein k≦n.

20. The method of claim 17, wherein the number M+k depends on a fault tolerance level of a network formed by a plurality of L servers.

21. The method of claim 17, wherein the number M+k is dynamically adjustable based on a fault tolerance level of a network formed by the plurality of L servers.

22. The method of claim 17, wherein the plurality of L servers form a distributed arbitrarily-connected network.

23. The method of claim 17, wherein the amount of redundancy data stored for each data file is increased by an amount of about 1/k of the original data file size.

24. The method of claim 17, further comprising creating at least M+k data units for storage on at least M+k servers.

25. The method of claim 17, wherein the same algorithm is used to create the M+k data units.

26. The method of claim 17, wherein the number L is variable.

27. A method for data storage comprising:
    defining a plurality of n data units that correspond to a data file;
    defining a number k of data units required for restoring the data file;
    defining a number of M servers out of a network of L servers that could be rendered inaccessible, wherein the number M is dynamically adjustable based on a fault tolerance level of the network; and
    creating M+k data units for storage on M+k servers, wherein M+k<=L.

28. The method of claim 27, wherein the data units are numbered and are of equal size.

29. The method of claim 27, wherein k≦n.

30. The method of claim 27, wherein the number M+k depends on the number L.

31. The method of claim 27, wherein all the data units are functionally equivalent.

32. The method of claim 27, wherein the amount of redundancy data stored for each file is increased by an amount of about 1/k of the original data file size.

33. The method of claim 27, wherein the network of L servers is a distributed arbitrarily-connected network.

34. The method of claim 27, further comprising creating at least M+k data units for storage on at least M+k servers.

35. The method of claim 27, wherein the same algorithm is used to create the M+k data units.

36. The method of claim 27, wherein the number L is variable.

37. A system for data storage comprising:
    n data units corresponding to a data file;
    k data units required to restore the data file;
    M servers in a network of L servers that could be rendered inaccessible; and
    M+k functionally equivalent data units for storage on M+k servers out of the L servers,
    wherein M+k<=L.

38. The system of claim 37, wherein the data units are numbered and are of equal size.

39. The system of claim 37, wherein k≦n.

40. The system of claim 37, wherein the M+k depends on a fault tolerance level of the network.

41. The system of claim 37, further comprising at least M+k data units for storage on at least M+k servers.

42. The system of claim 37, wherein the same algorithm is used to create the M+k data units.

43. The system of claim 37, wherein the number L is variable.

44. The system of claim 37, wherein the amount of redundancy data stored for each data file is increased by an amount of about 1/k of original data file size and can vary for the each data file.

45. The system of claim 37, wherein the network of L servers is a distributed arbitrarily-connected network.

46. A system for data storage comprising:
    n data units corresponding to a data file;
    k data units required to restore the data file;
    M servers in a network of L servers that could be rendered inaccessible, wherein the number M is dynamically adjustable based on a fault tolerance level of the network; and
    M+k data units for storage on M+k servers out of the L servers,
    wherein M+k<=L.

47. The system of claim 46, wherein the data units are numbered and of equal size.

48. The system of claim 46, wherein all the data units are functionally equivalent.

49. The system of claim 46, wherein k≦n.

50. The system of claim 46, wherein the number M+k depends upon the number L.

51. The system of claim 46, wherein the amount of redundancy data stored for each file is increased by an amount of about 1/k of original data file size and can vary for each data file.

52. The method of claim 46, wherein the network of L servers is a distributed arbitrarily-connected network.

53. The system of claim 46, further comprising at least M+k data units for storage on at least M+k servers.

54. The system of claim 46, wherein the same algorithm is used to create the M+k data units.

55. The system of claim 46, wherein the number L is variable.

56. A computer program product for data storage, the computer program product comprising a computer useable medium having computer program logic recorded thereon for controlling at least one processor, the computer program logic comprising:
    computer program code means for defining a plurality of n data units that correspond to a data file;
    computer program code means for defining a minimal number k of data units required to restore the data file;
    computer program code means for defining a number of M servers out of a plurality of L servers that could be rendered inaccessible; and
    computer program code means for creating M+k functionally equivalent data units for storage on M+k servers out of the plurality of L servers,
    wherein M+k<=L.

57. The computer program product of claim 56, wherein k≦n.

58. The computer program product of claim 56, wherein the number M+k depends on a fault tolerance level of a network formed by the plurality of L servers L.

59. The computer program product of claim 56, wherein the number M+k is dynamically adjustable based on a fault tolerance level of a network formed by the plurality of L servers.

60. The computer program product of claim 56, wherein the plurality of L servers form a distributed arbitrarily-connected network.

61. The computer program product of claim 56, wherein the amount of redundancy data stored for each data file is increased by an amount of about 1/k of the original data file size.

62. The computer program product of claim 56, further comprising at least M+k data units for storage on at least M+k servers.

63. The computer program product of claim 56, wherein the same algorithm is used to create the M+k data units.

64. The computer program product of claim 56, wherein the number L is variable.

65. A computer program product for data storage, the computer program product comprising a computer useable medium having computer program logic recorded thereon for controlling at least one processor, the computer program logic comprising:

computer program code means for defining a plurality of n data units that correspond to a data file;

computer program code means for defining a number k of data units required for restoring the data file;

computer program code means for defining a number of M servers out of a network of L servers that could be rendered inaccessible, wherein the number M is dynamically adjustable based on a fault tolerance level of the network; and computer program code means for creating M+k data units for storage on M+k servers, wherein M+k<=L.

66. The computer program product of claim 65, wherein the data units are numbered and are of equal size.

67. The computer program product of claim 65, wherein $k \leq n$.

68. The computer program product of claim 65, wherein the number M+k depends on the number L.

69. The computer program product of claim 65, wherein all the data units are functionally equivalent.

70. The computer program product of claim 65, wherein the amount of redundancy data stored for each file is increased by an amount of about 1/k of the original data file size.

71. The computer program product of claim 65, wherein the network of L servers is a distributed arbitrarily-connected network.

72. The computer program of claim 65, further comprising at least M+k data units for storage on at least M+k servers.

73. The computer program product of claim 65, wherein the same algorithm is used to create the M+k data units.

74. The computer program product of claim 65, wherein the number L is variable.

* * * * *